United States Patent
Lin et al.

(10) Patent No.: US 7,940,338 B2
(45) Date of Patent: May 10, 2011

(54) VOICE-CONTROLLED TV SET

(75) Inventors: Ming-Hui Lin, Taipei (TW); Yu-Chuan Chang, Taipei (TW)

(73) Assignee: Inventec Corporation, Taipei (TW)

( * ) Notice: Subject to any disclaimer, the term of this patent is extended or adjusted under 35 U.S.C. 154(b) by 1226 days.

(21) Appl. No.: 11/589,711

(22) Filed: Oct. 31, 2006

(65) Prior Publication Data

US 2008/0100747 A1    May 1, 2008

(51) Int. Cl.
*H04N 5/44* (2006.01)
*H04N 5/60* (2006.01)

(52) U.S. Cl. .................... 348/734; 348/725; 348/738

(58) Field of Classification Search .................. 348/725, 348/728, 729, 731–734, 736, 738; 725/37, 725/39; 340/825.22, 825.25, 825.72; 704/270, 704/275, 273, 276; *H04N 5/44, 5/50, 5/60*
See application file for complete search history.

(56) References Cited

U.S. PATENT DOCUMENTS

| | | | | |
|---|---|---|---|---|
| 5,226,090 A | * | 7/1993 | Kimura | 348/734 |
| 6,654,721 B2 | * | 11/2003 | Handelman | 725/39 |
| 7,023,498 B2 | * | 4/2006 | Ishihara | 348/734 |

* cited by examiner

*Primary Examiner* — Sherrie Hsia
(74) *Attorney, Agent, or Firm* — Muncy, Geissler, Olds, & Lowe, PLLC

(57) ABSTRACT

A voice-controlled TV set comprises a storage device, a voice controller, and a processor. The storage device is used to store a plurality of application programs, which is utilized to execute the various functions of the TV set; the voice controller is used to receive the voice of the user, and compare said voice with more than one voice instruction and then output a control code. Finally, the processor is used to execute the application program corresponding to the control code, so that the voice-controlled TV set is able to perform various functions according to the voice instructions given by the user.

9 Claims, 3 Drawing Sheets

VOICE-CONTROLLED TV SET

BACKGROUND

1. Field of Invention

The invention relates to a TV set, and in particular to a voice-controlled TV set.

2. Related Art

Nowadays, with the remarkable raise of the living standard of ordinary people, almost every household is provided with a plurality of audio-video equipment, such as a TV set, a video recorder player, audio equipment, and a video disk player. For the users more interested in the quality of an audio sound effect, the amplifier is an indispensable device. In addition, most of the audio-video equipments are provided with infrared remote controllers, thus enabling the user to remote control the related audio-video equipment executing the functions required.

Though the application of the remote control technology provides the users with the convenient operation and utilization of various audio-video equipment it also brings its problems. The respective audio-video equipment is provided with its own independent remote controllers. In an ordinary household, having audio-video equipment, more than one remote controller is utilized. Since the basic styles and appearances of the remote controllers are very similar, quite often the wrong remote controller is used and thus can not be operated correctly. Thus, the existence of such a problem brings about the emergence of the so-called Universal Remote-Controller on the market. Its ultimate purpose is to provide the capability of remote-controlling all the household electric appliances with a single unique remote controller. The idea of solving the problems created by the various different remote controllers is rather commendable. Yet, this solution may bring other problems. In order to include the specific functions of the various household electric appliances, in addition to the basic keys, many unique keys that can not be used commonly among various electric appliances must be provided, thus there are too many keys. In addition, it takes quite a lot of time and effort to learn how to operate the complicated universal remote controller, to execute the remote control of the various household electric appliances. Thus it is not quite convenient for users. As such, its operation convenience and practicability are not satisfactory.

Moreover, since wireless TV systems and Cable TV systems are widely utilized and very popular, the quality of the audio-video performance of TV sets has improved significantly, and the TV sets are further provided with multiple functions. Besides, the Cable TV systems are also provided with tens of channels to satisfy the requirements of various users. Thus, the convenience of the menu operation of TV sets is essential to the user, which may enable maximum utilization of the functions provided by the TV sets, shorten the nominal distance between the TV station and the customers, imparting a human touch to the programs and services rendered, and creating a user friendly atmosphere.

Presently, the universal remote controller and voice-controlled means are the most convenient ways in controlling the functions of various audio-video equipments. The conventional universal remote controller is used to execute the remote-control functions through the setting of the audio-video equipment. However, the surface area of the universal remote controller has too many keys to provide convenient and efficient operation. In order to contain so many keys in such a limited area, the size of the respective keys is reduced to the minimum, thus making their operation even more inconvenient.

In the conventional voice control function, the voice instructions are used to control the operations of the various audio-video equipments. Usually, users are required to follow specific rules or routes to execute different operations. In addition, in terminating operations currently executed, such specific rules or routes must be followed, thus the operation procedure is complicated and evidently not convenient for users.

SUMMARY OF THE INVENTION

In view of the above-mentioned drawbacks and shortcomings of the prior art, the objective of the invention is to provide a voice-controlled type TV set, in which voice instructions are utilized to control the TV set in executing the various operations without having to either follow specific rules or routes, or follow complicated operation procedures.

Therefore, to achieve the above-mentioned objectives, the invention discloses a voice-controlled TV set, including a storage device, a voice controller and a processor. The storage device is used to store a plurality of application programs; the voice controller is used to receive the voice of the user, and compare it with more than one voice instruction, then output a control code. The processor is used to execute the application program corresponding to the control code, so that the voice-controlled TV set may execute the various operations according to the voice instructions of the user.

Through the application of the voice-controlled TV set of the invention, during the execution of the TV set functions, all the user has to do is to issue the voice instructions, then the TV set will execute this particular operation as instructed, namely, the wanted operations, without having to either follow specific rules or routes, or follow complicated operation procedures.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given below for illustration only, and thus is not limitative of the present invention, wherein.

DETAILED DESCRIPTION OF THE INVENTION

The purpose, construction, features, and functions of the invention can be appreciated and understood more thoroughly through the following detailed description with reference to the attached drawings.

Figure 1:
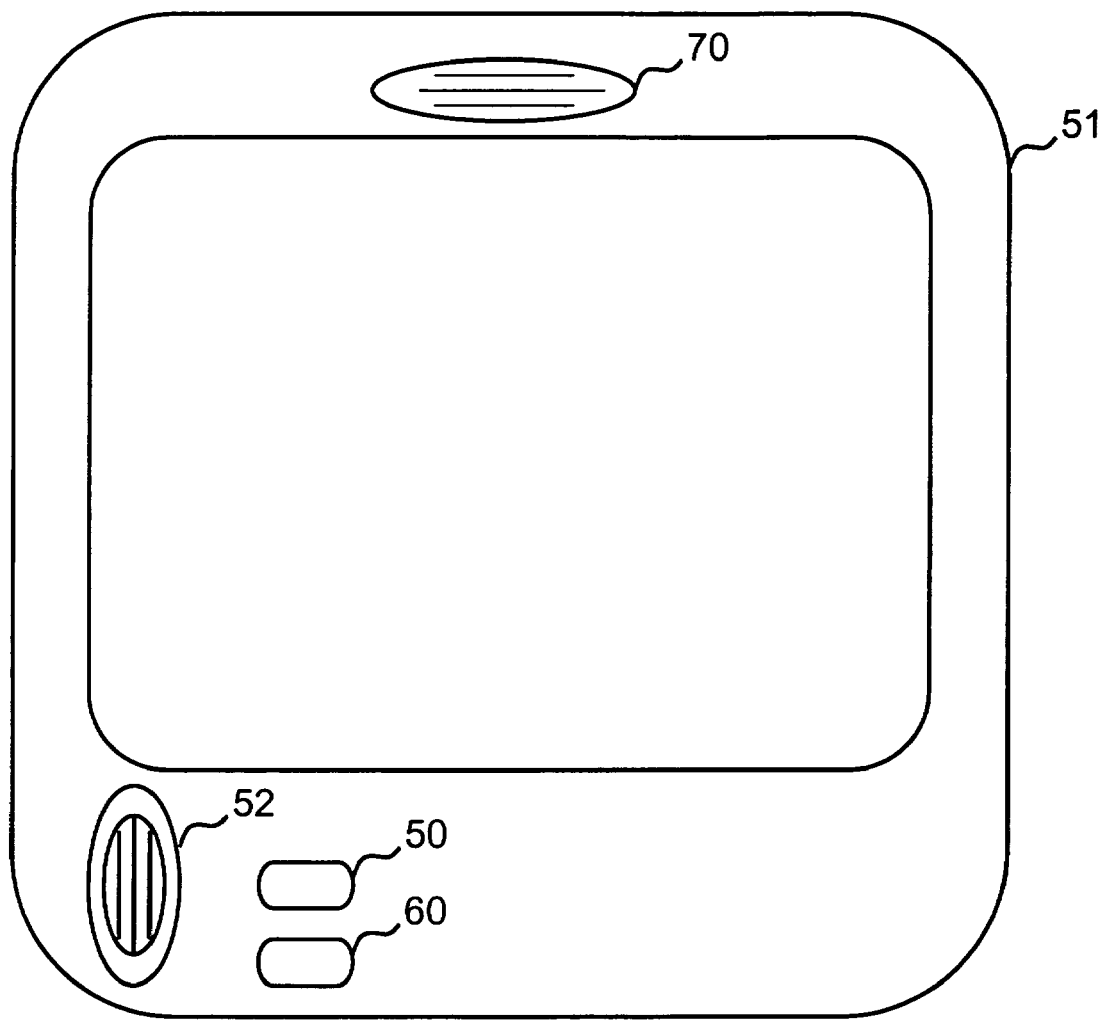
FIG. 1 is a schematic diagram of the structure of a voice-controlled TV set according to an embodiment of the invention.

Firstly, refer to FIG. 1 for a schematic diagram of the structure of a voice-controlled TV set according to an embodiment of the invention. As shown in FIG. 1, a TV set 51 is provided with a voice controller 52 used to receive and record the voice instructions given by the user, so that the TV set 51 will execute the various operations according to the voice instructions given by the user through a voice controller 52. Furthermore, a deletion key 50, a browser key 60 and a trumpet 70 are also provided on the TV set 51.

Figure 2:
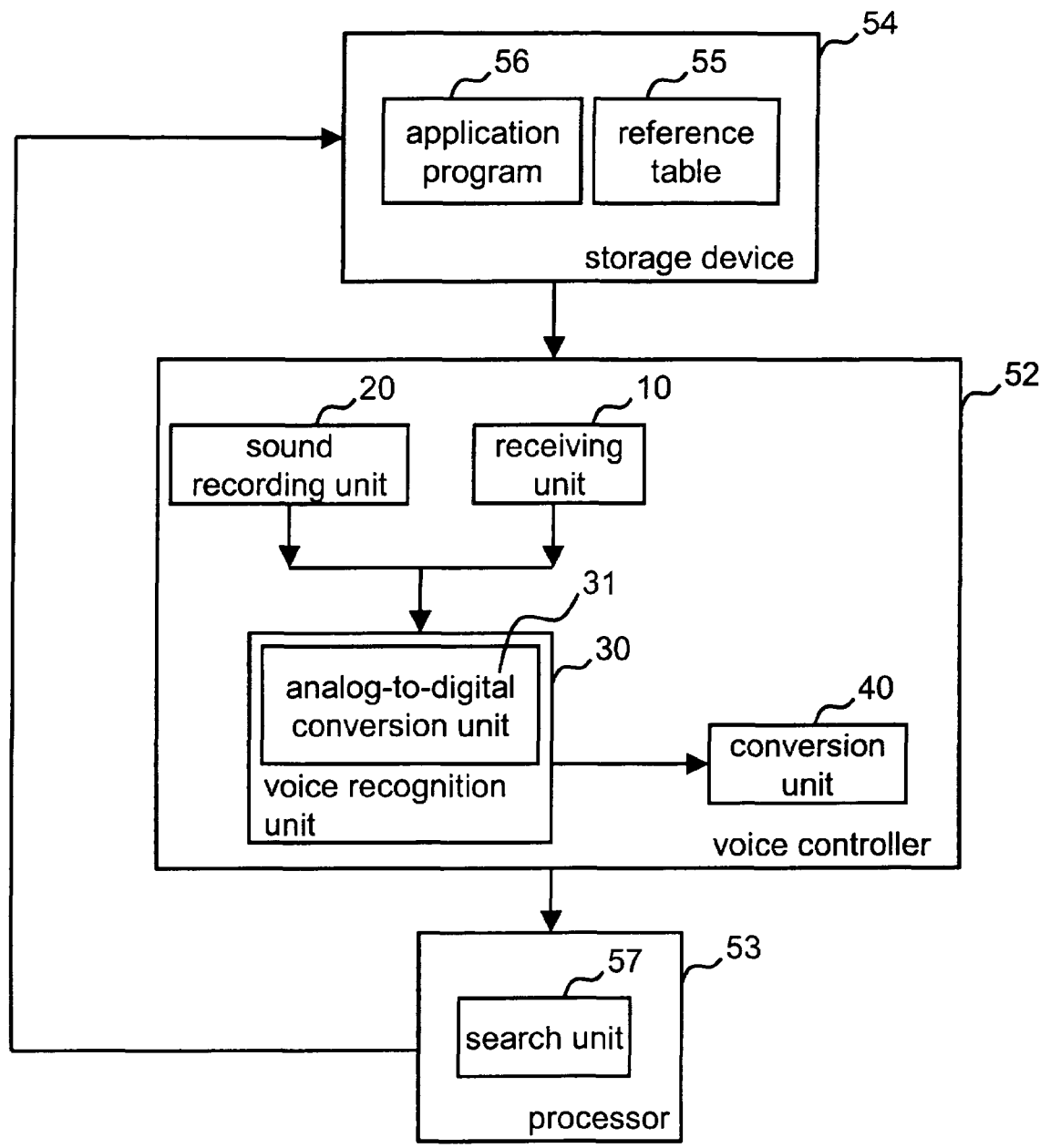
FIG. 2 is a system block diagram of a voice-controlled TV set according to an embodiment of the invention.

Next, refer to FIG. 2 for a system block diagram of a voice-controlled TV set according to an embodiment of the invention. As shown in FIG. 2, the voice-controlled TV set includes: a voice controller 52, a processor 53 and a storage device 54. The details of each of the respective devices are given as follows. The storage device 54 is used to store a plurality of application programs 6, such as a main menu application program, a program table application program, a program search application program, and a system set application program, with each of them utilized to execute the various different functions of a TV set 51. The storage device 54 is provided with a reference table 55, comprising the control code corresponding to the respective application programs 6.

The voice controller 52 is used to receive the voice of the user, and compare it with more than one voice instruction, then sends a control code to a processor 53, to obtain and execute the application program 56 corresponding to the control code, hereby performing the various functions of the TV set 51. The voice controller 52 includes a receiving unit 10, a sound recording unit 20, a voice recognition unit 30 and a conversion unit 40. Moreover, the processor 53 further includes a search unit 57. The details of structure and operation of these devices are given in the following paragraphs.

The receiving unit 10, is used to receive the voice of the user, such as a microphone.

The sound recording unit 20 is connected to the receiving unit 10, and is mainly used to record at least a voice instruction, such as: a Fast-Switch-Station, Full-Screen-Display, an Argument-Volume, etc., and storing the speed and volume of the corresponding voice instructions. In addition, the voice instructions stored in the sound recording unit 20 can be magnified and broadcasted through an audio amplifier (not shown) of a trumpet 70 installed on the TV set 51. The voice instruction is the combination of mono-syllables, single words, and phrases. The voice instructions can be given in Mandarin Chinese, Taiwanese, English or a combination of them.

The voice recognition unit 30 is electrically connected to a receiving unit 10 and a sound recording unit 20, and is used to compare the voice of the user with more than one voice instruction, thus outputting a recognition signal. In this process, the voice recognition unit 30 is utilized to convert the voice of the user and the sound of at least one voice instruction into digital audio signals through an analog-to-digital conversion unit 31, and then obtain the characteristics of digital audio signals of both, to make a comparison.

The conversion unit 40 is used to convert the recognition signal to a control code, and send it to a search unit 57 of a processor 53 to search the application program 56 corresponding to the control code. Then, the processor 53 is used to execute the application program 56 corresponding to the control code, so that the TV set 51 may directly implement the various operations according to the voice instructions given by the user.

Figure 3:
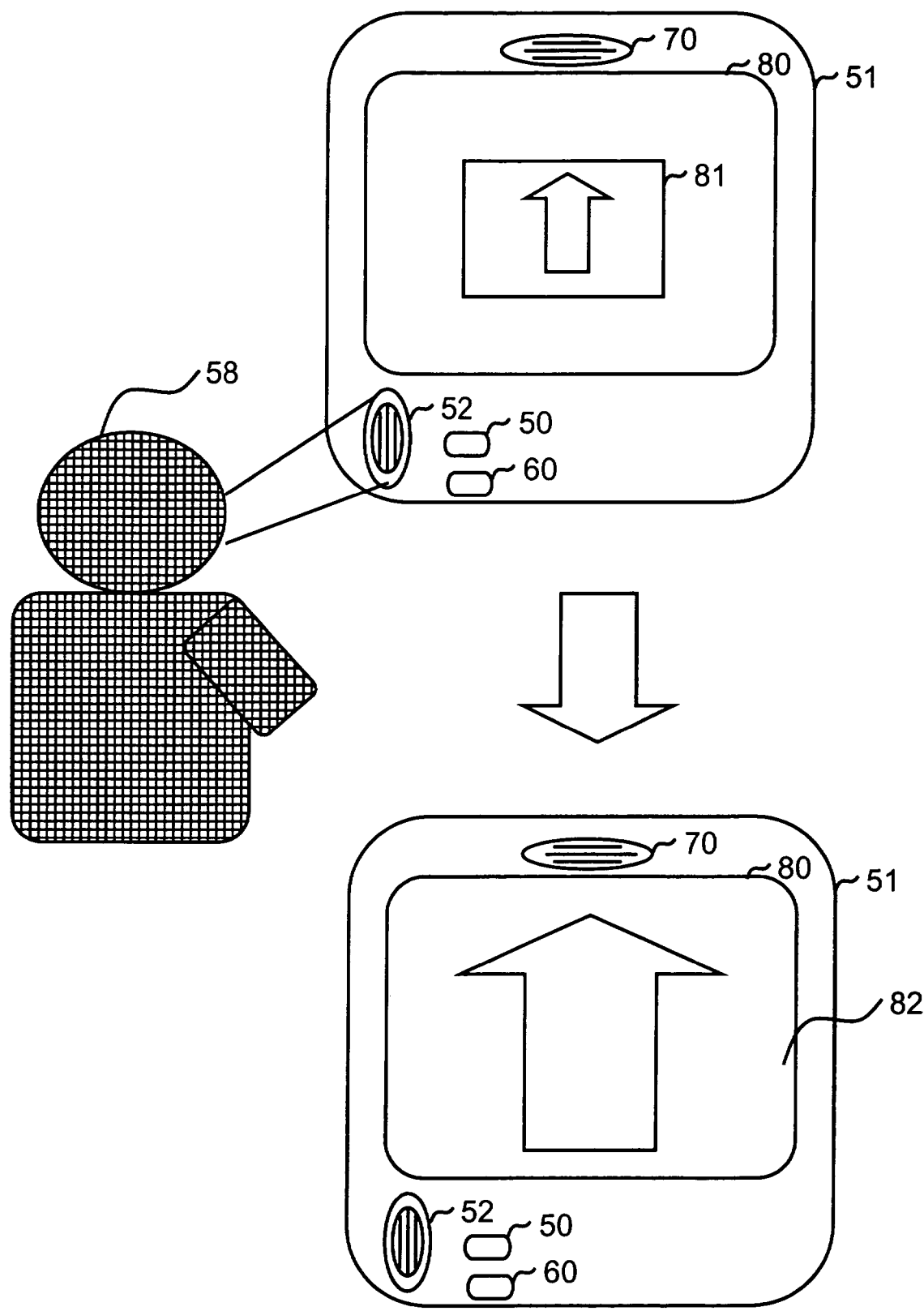
FIG. 3 is a schematic diagram indicating the change of TV set screens from a small image to an entire image. As such, voice instructions given by the user according to an embodiment of the invention are implemented.

Subsequently, refer to FIG. 3 for a schematic diagram indicating the change of a TV set screen in implementing the voice instructions given by the user according to an embodiment of the invention. In the implementation of the embodiment, the storage device 54 of the TV set 51 is stored with a main menu application program, a program table application program, a program search application program, a system setting application program, etc. The respective application programs are used to execute different functions of the TV set 51. The storage device 54 is further provided with a reference table 55, which contains the control code corresponding to the respective application program 56.

In application, the voice instructions having the display of an entire image are recorded in advance by the user 58 through a voice controller 52. Meanwhile, the sound recording unit 20 is used to record and store the voice instructions given by the user. Then, the user calls out the voice instruction, having an entire image through the voice controller 52, and receives the voice instruction of an entire image through a microphone, namely the above-mentioned receiving unit 10 built in the voice controller 52. Subsequently, upon receiving the voice-instruction having the display of an entire image, it is converted with at least one voice instruction into the digital audio signals by making use of the analog-to-digital conversion unit 31 in a voice recognition chip, namely the voice recognition unit 30. Then, the respective digital audio signals are compared to generate a recognition signal.

Then, the recognition signal thus obtained is converted into a control code through a conversion chip, namely the conversion unit 40. Finally, the search unit 57 in the central processing unit, namely the processor 53, is used to search the application program 56 by means of the control code, so that the processor may execute the application program 56 corresponding to the control code. Thus, the TV set 51 may directly execute various operations according to the voice instructions of the user through switching from a small screen 81 to an entire screen 82 in a display panel 80.

Furthermore, the voice controller of the invention is provided with a plurality of key-sets, having instruction recording functions for various different users to record voice instructions, so that more than one set of the recorded voice instructions may be deleted by pressing the deletion key, or the respective recorded voice instructions may be browsed by pressing the browser key. As such, the voice-controlled TV set of the invention can be utilized to perform various operations by more than one user through the control of the voice controller.

Summing up the above, the voice-controlled TV set of the invention can be used by the user to control the operation of the TV set in a voice-controlled manner, thus directly executing the voice instructions given by the user without having to either follow specific rules or routes or follow complicated operation procedures, as such improving the operation convenience of the TV set.

Knowing the invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A voice-controlled TV set, comprising:
a storage device, used to store a plurality of application programs;
a voice controller, used to receive the voice of the user, and compare said voice with more than one voice instructions and then output a control code, wherein said voice instruction is made in the languages by selecting from a group comprising Mandarin, Taiwanese, English, and a combination of them, and the voice controller comprises:
a receiving unit, used to receive said voice of said user;

a sound recording unit, connected to said receiving unit, and is used to record said voice instruction;

a voice recognition unit, used to compare said voice with said voice instruction and output a recognition signal; and a conversion unit, used to convert said recognition signal into said control code; and a processor, used to execute said application program corresponding to said control code.

2. The voice-controlled TV set as claimed in claim 1, wherein said voice recognition unit includes an analog-to-digital conversion unit, used to convert said voice and said voice instruction into a digital audio signal.

3. The voice-controlled TV set as claimed in claim 1, wherein said voice instruction is composed by selecting from a group comprising mono-syllables, single words, and phrases.

4. The voice-controlled TV set as claimed in claim 1, wherein said storage device is provided with a reference table including said control codes corresponding to said respective application programs.

5. The voice-controlled TV set as claimed in claim 1, wherein said application program is selected from the group comprising a main menu application program, a program table application program, a program search application program, and a system set application program.

6. The voice-controlled TV set as claimed in claim 1, wherein said processor includes a search unit, which is used to search said application program corresponding to said control code.

7. The voice-controlled TV set as claimed in claim 1, further comprising a trumpet, used to broadcast said voice instruction.

8. The voice-controlled TV set as claimed in claim 1, further comprising a deletion key, used to delete the unnecessary voice instructions.

9. The voice-controlled TV set as claimed in claim 1, further comprising a browser key, used to browse said respective voice instructions.

* * * * *